United States Patent

[11] 3,621,055

[72] Inventors Adolf Fischer
  Mutterstadt Pfalz;
  Karl-Heinz Koenig, Ludwigshafen; Gustav Steinbrunn, Schwegenheim Pfalz; Albrecht Zwchocke, Bad Duerkheim, all of Germany
[21] Appl. No. 652,034
[22] Filed July 10, 1967
[45] Patented Nov. 16, 1971
[73] Assignee Badische Anilin- & Soda-Fabrik Aktiengesellschaft
  Ludwigshafen am Rhine, Germany
[32] Priorities July 19, 1966
[33] Germany
[31] P 15 42 834.9;
  Jan. 17, 1967, Germany, No. P 16 42 217.6

[54] UREA DERIVATIVES AND METHODS FOR CONTROLLING UNWANTED PLANT GROWTH
5 Claims, No Drawings

[52] U.S. Cl. ................................................ 260/545 R, 71/103, 71/105, 71/115, 71/120, 260/453 R, 260/500.5
[51] Int. Cl. .................................................. C07c 127/22
[50] Field of Search ......................................... 260/345

[56] References Cited
UNITED STATES PATENTS
3,192,261  5/1965  Losee et al. ................... 260/545
OTHER REFERENCES
Exner, Coll. Chechoslov Chem. Commun. 26 701– 709 1961 (p. 702)

Primary Examiner—Lewis Gotts
Assistant Examiner—Robert Gerst
Attorney—Marzall, Johnston, Cook & Root ABSTRACT: Urea derivatives and method for controlling unwanted plant growth.

UREA DERIVATIVES AND METHODS FOR CONTROLLING UNWANTED PLANT GROWTH

The present invention relates to urea derivatives, in particular phenylurea derivatives containing carboxy or ester groups, and to methods of controlling undesirable plant growth with these compounds.

It is known that trisubstituted ureas, e.g., N-p-chlorophenyl-N'-N'-dimethylurea and N-4-chlorophenyl-N'-methyl-N'-methoxyurea, may be used as the active ingredients of herbicides. However their action is not satisfactory.

An object of the invention is to provide new phenylurea derivatives. Another object of the invention is to provide valuable new phenylurea derivatives containing carboxy groups. A further object of the invention is to provide valuable new phenylurea derivatives containing ester groups. Yet another object of the invention is to provide a method of controlling unwanted plant growth without injuring crop plants and a method for controlling all plants over a specific area.

These and other objects of the invention are achieved with compounds having the formula

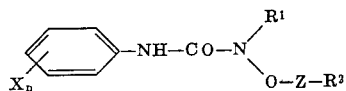

ion which X denotes halogen or a nitro, cyano, trifluoromethyl, methoxy, methylsulfonyl, lower alkyl or lower alkoxy group or a phenoxy group which may be substituted by chlorine, the X radicals being identical or different and $n$ denotes one of the integers zero to three, $R^1$ denotes hydrogen, a lower aliphatic radical which may be substituted by chlorine or a cycloalkyl radical which may be substituted by methyl, Z denotes a —CO— group or a linear or branched aliphatic radical which may be substituted by halogen and $R^2$ denotes an aliphatic radical which may be substituted by halogen or methoxy or a phenoxymethyl radical which may be substituted by chlorine or methyl or a benzyl or phenyl radical which may be substituted by halogen or a cyclopropyl radical or $R^2$ denotes the radical

in which $R^3$ denotes hydrogen, a lower aliphatic radical or a methoxy radical, and $R^4$ denotes a lower aliphatic radical, and, where Z denotes an aliphatic radical, $R^2$ denotes a carboxy group or the salt of a carboxy group or a nitrilo, alkoxycarbonyl or aryloxycarbonyl group or the group

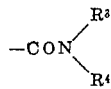

in which $R^3$ and $R^4$ denote hydrogen or a lower aliphatic radical. These compounds have a good herbicidal action on broadleaved and grass weeds, are well tolerated by and have no injurious aftereffect on cereals, Indian corn and rice and have a rapid onset of action.

These compounds are suitable for controlling unwanted plants growing among crops without injuring the crops. Furthermore they have short residual action so that after the crop plants have been harvested new plants can be sown without suffering any injury.

By salts we mean alkali metal salts or alkaline earth metal salts, e.g., the sodium, potassium, magnesium or calcium salts, or the ammonium salts or the salts of amines, e.g., of dimethylamine, triethylamine, triethanolamine or ethanolamine.

The active ingredients may be prepared by conventional methods by reacting substituted N-pehnyl-N'-hydroxyureas with acid halides or carbamoyl halides in the presence of alkaline reagents; the N-phenyl-N'-hydroxyureas may be prepared for example from the corresponding isocyanates and substituted hydroxylamines. The active ingredients may also be prepared for example by reacting the alkali metal or alkaline earth metal salts of N'-hydroxyurea derivatives with halocarboxylic acids, halocarboxylic acid esters, halocarboxylic amides or halogenated aliphatic nitriles; the N-hydroxyurea derivatives may be prepared for example from the corresponding isocyanates and substituted hydroxylamines.

The following descriptions illustrate how the new substituted urea derivatives are prepared (parts specified are parts by weight unless otherwise stated).

N-3,4-dichlorophenyl-N'-methyl-N'-(dimethylcarbamoyl)-hydroxyurea of the formula

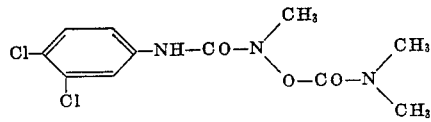

5.4 parts of dimethylcarbamoyl chloride is dripped while stirring at 35° C. into 12 parts of N-3,4-dichlorophenyl-N'-methyl-N'-hydroxyurea dissolved in 75 parts of toluene and 5.2 parts of triethylamine. The reaction mixture is then kept at 60° to 65° C. for some hours. After cooling, the mixture is washed with water, dried and freed of solvent in vacuo. The crystalline residue is recrystallized from toluene. 14 parts of N-3,4-dichlorophenyl-N'-methyl-N'-(dimethylcarbamoyl)-hydroxyurea is obtained with a melting point of 134° to 136° C.; chlorine found: 23.6 percent, calc.: 23.2 percent.

N-3,4-dichlorophenyl-N'-methyl-N'-(dichlorophenoxyaceto)-hydroxyurea of the formula

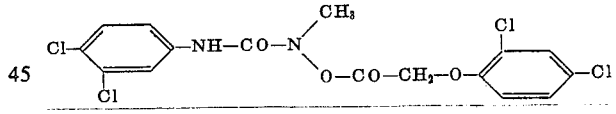

12 parts of 2,4-dichlorophenoxyacetic chloride dissolved in 10 parts of toluene is dripped while stirring at 20° to 30° C. into a solution of 12 parts of N-3,4-dichlorophenyl-N'-methyl-N'-hydroxyurea, 75 parts of toluene and 5.2 parts of triethylamine. The reaction mixture is then kept between 40° and 50° C. for some hours. After cooling, the mixture is washed with water, dried and freed of solvent in vacuo. The crystalline residue is recrystallized from a mixture of toluene and petroleum ether. 21 parts of N-3,4-dichlorophenyl-N'-methyl-N' .-(2,4-dichlorophenoxyaceto)-hydroxyurea is obtained with a melting point of 115° to 117° C.; chlorine found: 32.4 percent, calc.: 32.4 percent.

N-3-chlorophenyl-N'-methyl-N'-carboxymethoxyurea of the formula

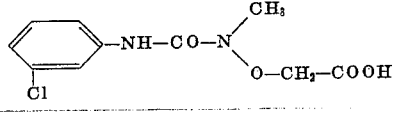

20 parts of N-3-chlorophenyl-N'-methyl-N'-hydroxyurea is suspended in 100 parts of water and the suspension is dissolved while stirring well at room temperature in 6 parts of potassium hydroxide dissolved in 10 parts of water. To the solution thus obtained there is added at room temperature a solution of 10 parts of chloroacetic acid in 35 parts of water which has previously been neutralized with an equivalent amount of sodium bicarbonate solution at 10° to 15° C. The reaction mixture is then stirred at 40° to 50° C. for several hours. The mixture is then acidified with dilute hydrochloric acid (2N) while cooling and the resulting precipitate is suction filtered, washed with water and dried. 22 parts of N-3-chlorophenyl-N'-methyl-N'-carboxymethoxyurea is obtained with a melting point of 148° to 150° C.

N-3,4-dichlorophenyl-N'-methyl-N'-carbomethoxymethoxyurea of the formula

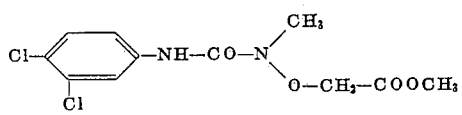

23.5 parts of N-3,4-dichlorophenyl-N'-methyl-N'-hydroxyurea is dissolved in 100 parts of ethanol and dissolved while stirring well in a solution of 4 parts of sodium hydroxide and 20 parts of water. The resulting solution is evaporated to dryness in vacuo and the residue is suspended in 100 parts of toluene and reacted with 18 parts of methyl bromoacetate at room temperature. The mixture is then stirred for several hours at 60° C., the precipitated sodium bromide is suction filtered and the filtrate is evaporated to dryness in vacuo. After being recrystallized from methanol, 24 parts of N-3,4-dichlorophenyl-N' -methyl-N'-carbomethoxymethoxyurea is obtained with a melting point of 83° to 85° C.

N-4-chlorophenyl-N'-methyl-N'-carbamoylmethoxyurea of the formula

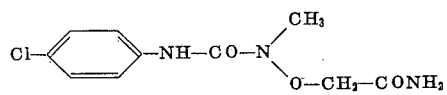

20 parts of N-4-chlorophenyl-N'-methyl-N'-hydroxyurea is suspended in 100 parts of water and dissolved while stirring well at room temperature in a solution of 6 parts of potassium hydroxide and 10 parts of water. A solution of 9.3 parts of chloroacetamide and 100 parts of water is dripped at room temperature into the solution obtained above. The mixture is then stirred for 1 hour at room temperature. The precipitate formed is suction filtered, washed with water and dried. 20 parts of N-4-chlorophenyl-N'-methyl-N'-carbamoylmethoxyurea is obtained with a melting point of 141° to 143° C.

The other active ingredients according to the invention may be prepared analogous methods. Depending on the acid halide or carbamic halide used, the temperature of the esterification may be between −20° and +100° C., preferably however between 0° and 70° C.

The following substituted N'-hydroxyureas are examples of suitable starting materials in the production of the compounds according to the invention:

N-3,4-dichlorophenyl-N'-methyl-N'-hydroxyurea
N-3-chlorophenyl-N'-methyl-N'-hydroxyurea
N-4-chlorophenyl-N'-methyl-N'-hydroxyurea
N-3,4-dichlorophenyl-N'-isopropyl-N'-hydroxyurea
N-3-chlorophenyl-N'-isopropyl-N'-hydroxyurea
N-3-trifluoromethylphenyl-N'-methyl-N'-hydroxyurea
N-3-nitrophenyl-N'-methyl-N'-hydroxyurea
N-phenyl-N'-ethyl-N'-hydroxyurea
N-3-tolyl-N'-methyl-N'-hydroxyurea
N-4-(4'-chlorophenoxy)-phenyl-N'-methyl-N'-hydroxyurea.

The following compounds are suitable halocarboxylic acids or their derivatives for the production of the urea derivatives: α-chloroacetic acid, α-bromoacetic acid, α-chloropropionic acid, α-bromopropionic acid, α-chlorobutyric acid, α-bromobutyric acid, α-chloroisobutyric acid, αbromoisobutyric acid, β-chloropropionic acid, β-bromopropionic acid, α,α-dichloropropionic acid, α,α-dibromopropionic acid, α-chloroacetonitrile, α-bromoacetonitrile, α-chloropropionitrile, α-bromopropionitrile, methyl α-chloroacetate, methyl α-bromoacetate, methyl α-chloropropionate, methyl α-bromopropionate, α-chloroacetamide, α-bromoacetamide, α-chlorodimethylacetamide, α-bromodimethylacetamide, α-chloro-N-methyl-N-isobutynylacetamide and α-bromo-N-methyl-N-isobutynylacetamide.

The following substances are examples of active ingredients according to this invention:

| X | n | R¹ | Z | R² | M.P. |
|---|---|----|---|----|------|
| 4-Br | 1 | —CH₃ | —CO— | —CH(CH₂)(CH₂) (cyclopropyl) | 92 to 94° C. |
| 3-Cl | 1 | —CH₃ | —CO— | —N(CH₃)₂ | 104 to 106° C. |
| 4-Cl | 1 | —CH(CH₃)₂ | —CO— | —C₆H₅ | 150 to 151° C. |
| 3-NO₂ | 1 | —CH₃ | —CO— | —CH(CH₃)₂ | 78 to 80° C. |
| 3,4-Cl | 2 | —CH₃ | —CO— | —CH(C₂H₅)—(CH₂)₃—CH₃ | 63 to 65° C. |
| 4-Br | 1 | —CH₃ | —CO— | —C(CH₃)=CH₂ | 80 to 82° C. |
| 3,4-Cl | 2 | —CH₃ | —CO— | —C(CH₃)(CH₃)—CH₂Br | 92 to 94° C. |

| X | n | R¹ | Z | R² | M.P. |
|---|---|---|---|---|---|
| 3-CF₃ | 1 | —CH₃ | —CO— | —N(CH₃)₂ | 90 to 92° C. |
| 4-F | 1 | —CH₃ | —CO— | Same as above | 98 to 100° C. |
| 4-Br | 1 | —CH₃ | —CO— | —CH(CH₃)₂ | 65 to 67° C. |
| 3-Cl | 1 |  | —CO— | —N(CH₃)₂ | 90 to 92° C. |
| 3,4-Cl | 2 | —CH₃ | —CO— | —CH(CH₃)₂ | B.P.₀.₅=77 to 80° C. |
| 3,4-Cl | 2 | —CH₃ | —CO— | —C(Cl)(CH₃)(C₂H₅) | B.P.₀.₅=102 to 104° C. |
| 3-CH₃ | 1 | —CH₃ | —CO— | —CH(CH₃)₂ | 80° C. |
| 2-CH₃, 4-CH₃ | 2 | —CH₃ | —CO— | —CH₃ | 76° C. |
| 2-CH₃, 4-Cl | 2 | —CH₃ | —CO— | —CH₃ | 92° C. |
| 2-CH₃, 4-Cl | 2 | —CH₃ | —CO— | —CH(CH₃)₂ | 63° C. |
| 2-CH₃, 5-Cl | 2 | —CH₃ | —CO— | Same as above | 73° C. |
| 3-Cl, 4-CH₃ | 2 | —CH₃ | —CO— | —CH₃ | 62° C. |
| 3-Cl, 4-CH₃ | 2 | —CH₃ | —CO— | —CH(CH₃)₂ | 57° C. |
| 4-Cl | 1 | —CH₃ | —CO— | Same as above | 63° C. |
| 4-Cl | 1 | —CH₃ | —CO— | —C(CH₃)₃ | 70° C. |
| 3-Cl | 1 | —CH₃ | —CO— | —CH₃ | B.P.₀.₁=65° C. |
| 3-Cl | 1 | —CH₃ | —CO— | —CH(CH₃)₂ | 61° C. |
| 3-Cl | 1 | —CH₃ | —CO— | —CH=C(CH₃)₂ | 110° C. |
| 3-Cl | 1 | —CH₃ | —CO— | —CH=CH—CH₃ | B.P.₀.₂=85° C. |
| 3-Cl | 1 | —CH₃ | —CO— | —C(CH₃)=CH₂ | 35° C. |
| 3-Cl | 1 | —CH₃ | —CO— | —C(CH₃)(CO₂)—CH₃ | 56° C. |
| 3,4-Cl | 2 | —CH₃ | —CO— | —CH₂CH₃ | 72° C. |
| 3,4-Cl | 2 | —CH₃ | —CO— | —CO₂Cl | 74° C. |
| 3,4-Cl | 2 | —CH₃ | —CO— | —CH₂CH₂CH₃ | 76° C. |
| 3,4-Cl | 2 | —CH₃ | —CO— | —C(CH₃)=CH₂ | 100° C. |
| 3,4-Cl | 2 | —CH₃ | —CO— | —CH₂—CH=CH₂ | 96° C. |
| 3,4-Cl | 2 | —CH₃ | —CO— | —CH=CH—CH₃ | 99° C. |
| 3,4-Cl | 2 | —CH₃ | —CO— | —(CH₂)₅Cl | 66° C. |
| 3,4-Cl | 2 | —CH₃ | —CO— | —C(CH₃)₃ | B.P.₀.₁=95° C. |

| X | n | R¹ | Z | R² | M.P. |
|---|---|---|---|---|---|
| 3,4-Cl | 2 | —CH₃ | —CO— | —CH₂—C(CH₃)₂—CH₃ | 115° C. |
| 3,4-Cl | 2 | —CH₃ | —CO— | —CH₂—O—C₆H₅ | 111° C. |
| 4-Br | 1 | —CH₃ | —CO— | —CH₂—CH₃ | 60° C. |
| 4-Br | 1 | —CH₃ | —CO— | —CH=C(CH₃)₂ | 132° C. |
| 3-Cl, 4-Br | 2 | —CH₃ | —CH(CH₃)— | —COOH | 146° C. |
| 3-CF₃-4-Br | 2 | —CH₃ | —CH₂— | —COOH | 99 to 100° C. |
| 3,4-Cl | 2 | —CH₃ | —CH(C₂H₅)— | —COOH | 145 to 146° C. |
| 3,4-Cl | 2 | —CH₃ | —C(CH₃)₂— | —COOH | 100° C. |
| 3,4-Cl | 2 | —CH₃ | —CH₂—CH₂— | —COOH | 134° C. |
| 3,4-Cl | 2 | —CH₃ | —CH₂— | —COOCH₃ | 83 to 85° C. |
| 3,4-Cl | 2 | —CH₃ | —(CH₂)₅— | —COOCH₃ | 120 to 121° C. |
| 3,4-Cl | 2 | —CH₃ | —CH₂— | —CONHCH₃ | 120° C. |
| 3-Cl | 1 | —CH₃ | —CH₂— | —CON(CH₃)(C(CH₃)—C≡CH) | 111 to 112° C. |
| 4-Cl | 1 | —CH₃ | —CH₂— | —CON(CH₃)(C(CH₃)—C≡CH) | 82° C. |
| 3-CF₃ | 1 | —CH₃ | —CH₂— | —CONH₂ | 126 to 127° C. |
| 3-CH₃ | 1 | —CH₃ | —CH₂— | —CONH₂ | 145° C. |
| 4-Br | 1 | —CH₃ | —CH₂— | —CONH₂ | 121° C. |
| 3,4-Cl | 2 | —CH₃ | —CH₂— | —CONH₂ | 146 to 147° C. |
| 4-Cl | 1 | —CH₃ | —CH(CH₃)— | —COONH₄ | 116 to 117° Cl. |
| 4-Cl | 1 | —CH₃ | Same as above | —COONa | 150° C. |
| 3,4-Cl | 2 | —CH₃ | —CH₂— | —COOH | 184 to 185° C. |
| 3-CF₃ | 1 | —CH₃ | —CH₂— | —COOH | 156 to 158° C. |
| 3-NO₂ | 1 | —CH₃ | —CH₂— | —COOH | 175° C. |
| 4-Cl | 1 | —CH₃ | —CH₂— | —COOH | 139 to 140° C. |
| 3-Cl | 1 | —CH₃ | —CH₂— | —COOH | 148 to 150° C. |
|  | 0 | —CH₃ | —CH₂— | —COOH | 118 to 119° C. |
| 4-Cl | 1 | —CH(CH₃)₂ | —CH₂— | —COOH | 146° C. |
| 3,4-Cl | 2 | Same as above | —CH₂— | —COOH | 156 to 157° C. |
| 2-CH₃-4-Cl | 2 | —CH₃ | —CH₂— | —COOH | 114 to 115° C. |
| 2,4 CH₂O— | 2 | —CH₃ | —CH₂— | —COOH | 105 to 106° C. |
| 3-CH₃ | 1 | —CH₃ | —CH₂— | —COOH | 146 to 147° C. |
| 4-Br | 1 | —CH₃ | —CH₂— | —COOH | 150 to 151° C. |
| 4—Cl—C₆H₄—O— | 1 | —CH₃ | —CH₂— | —COOH | 130° C. |
| 3-Br-4-F | 2 | —CH₃ | —CH₂— | —COOH | 118 to 119° C. |
| 4-Cl | 1 | —CH₃ | —CH(CH₃)— | —COOH | 132 to 133° C. |
| 3-Cl | 1 | —CH₃ | Same as above | —COOH | 131 to 132° C. |

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high-boiling points, such as kerosene or diesel oil, coal tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water or by mixing the salts with water, to prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. The active ingredients may also be applied as granulates.

The active ingredients may be mixed with insecticides, fungicides, bactericides and other herbicides as well as with fertilizers.

Dusts may be prepared by mixing or grinding the active ingredients with a solid carrier.

The following examples illustrate the application of the active ingredients according to this invention.

EXAMPLE 1

In a greenhouse plastic pots having a diameter of 8 cm. were filled with loamy sandy soil and seeds of cotton (Gossypium spp.), Indian corn (Zea mays), barley (Hordeum vulgare), wheat (Triticum vulgare), wild mustard (Sinapis arvensis), white goosefoot (Chenopodium album), small nettle (Urtica urens), chickweed (Stellaria media), gallant soldier (Galinsoga parviflora), annual meadow grass (Poa annua) and slender foxtail (Alopecurus myosuroides) were sown therein. The soil thus prepared was then treated with N-3,4-di-chlorophenyl-N'-methyl-N'-(dimethylcarbamoyl)-hydroxyurea (I), N-3,4-dichlorphenyl-N'-methyl-N'-(2,4-dichlorophenoxyaceto)-hydroxyurea (II) and, for comparison, with N-p-chlorophenyl-N',N'-dimethylurea (III), each at a rate of 3 kg. of active ingredient per hectare dispersed in 500 liters of water. After 3 to 4 weeks it was observed that compounds I and II had about as good a herbicidal action as III, but they were better tolerated by cotton, Indian corn, barley and wheat. The results of the experiment can be seen from the following table.

| | Active ingredient | | |
|---|---|---|---|
| | I | II | III |
| Crop plants | | | |
| Cotton | 0 | 0 | 10-20 |
| Indian corn | 0 | 0 | 20 |
| Barley | 10 | 5 | 30-40 |
| Wheat | 5 | 0-5 | 40-50 |
| Unwanted plants | | | |
| Wild mustard | 90-100 | 90-100 | 100 |
| White goosefoot | 90-100 | 90-100 | 90-100 |
| Small nettle | 100 | 100 | 100 |
| Chickweed | 90-100 | 90-100 | 90-100 |
| Gallant soldier | 90-100 | 90-100 | 90-100 |
| Annual meadow grass | 90 | 95-90 | 90 |
| Slender foxtail | 80-90 | 80-90 | 80-90 |

0 = no injury
100 = complete kill

The following compounds have the same biological activity as active ingredients I and II in examples 1 and 2:

N-3,4-dichlorophenyl-N'-methyl-N'-(cyclopropanoyl)-hydroxyurea
N-4-bromophenyl-N'-methyl-N'-(isobutyryl)-hydroxyurea
N-4-cyanophenyl-N'-methyl-N'-(3,3-dichloroacryloyl)-hydroxyurea
N-3,4-dichlorophenyl-N'-methyl-N'-(diisopropylcarbamoyl)-hydroxyurea
N-3-trifluoromethylphenyl-N'-methyl-N'-(methylmethoxycarbamoyl)-hydroxyurea
N-3-chloro-4-methylphenyl-N'-methyl-N'-(methacryloyl)-hydroxyurea
N-3,4-dichlorophenyl-N'-methyl-N'-(methylisobutynylcarbamoyl)-hydroxyurea
N-3-nitrophenyl-N'-methyl-N'-(isobutyryl)-hydroxyurea
N-4-(4'-chlorophenoxy)-phenyl-N'-isopropyl-N'-(dimethylcarbamoyl)-hydroxyurea
N-3,4-dichlorophenyl-N'-methyl-N'-(2,4-dichlorobenzoyl)-hydroxyurea.

EXAMPLE 2

In a greenhouse the plants Indian corn (Zea mays), barley (Hordeum vulgare), wheat (Triticum vulgare), rye (Secale cereale), wild mustard (Sinapis arvensis), white goosefoot (Chenopodium album), small nettle (Urtica urens), bur marigold (Bidens pilosa), summer cypress (Kochia scoparia), wild oats (Avena fatua), annual meadow grass (Poa annua) and slender foxtail (Alopecurus myosuroides) were treated at a growth height of 4 to 17 cm. with N-3,4-dichlorophenyl-N'-methyl-N'-(dimethylcarbamoyl)-hydroxyurea (I), N-3,4-dichlorophenyl-N'-methyl-N'-(2,4-dichlorophenoxyaceto)-hydroxyurea (II), N-3,4-dichlorophenyl-N'-methyl-N'-(isobutyryl)-hydroxyurea (III), N-3,4-dichlorophenyl-N'-methyl-N'-(2-chloro-2-methylbutanoyl)-hydroxyurea (IV) and, for comparison, with N-p-chlorophenyl-N',N'-dimethylurea (V), each at a rate of 3 kg. of active ingredient per hectare dispersed in 500 liters of water. After 3 to 4 weeks it was observed that compounds I, II, III and IV had a stronger herbicidal action than V and were better tolerated by Indian corn, barley, wheat and rye. The results of the experiment can be seen from the following table.

| | Active ingredient | | | | |
|---|---|---|---|---|---|
| | I | II | III | IV | V |
| Crop plants | | | | | |
| Indian corn | 10 | 10 | 0-10 | 10-15 | 20-30 |
| Barley | 10 | 5-10 | 0-10 | 10 | 70 |
| Wheat | 0 | 10 | 0 | 10 | 90 |
| Rye | 10 | 5-10 | 0-10 | 10 | 80 |
| Unwanted plants | | | | | |
| Wild mustard | 100 | 100 | 100 | 100 | 100 |
| White goosefoot | 100 | 100 | 100 | 100 | 90-100 |
| Small nettle | 100 | 100 | 100 | 100 | 100 |
| Bur marigold | 90-100 | 90 | 90-100 | 90-100 | 90 |
| Summer cypress | 100 | 90 | 90-100 | 90 | 80 |
| Wild oats | 90-100 | 90 | 90-100 | 90 | 80 |
| Annual meadow grass | 90-100 | 90 | 100 | 90-100 | 80-90 |
| Slender foxtail | 90-100 | 90 | 100 | 90-100 | 80-90 |

0 = no injury
100 = complete kill

EXAMPLE 3

An experimental plot was sown with wild mustard (Sinapis arvensis), white goosefoot (Chenopodium album), small nettle (Urtica urens), chickweed (Stellaria media), gallant soldier (Galinsoga parviflora), annual meadow grass (Poa annua) and slender foxtail (Alopecurus myosuroides) and sprayed on the day of sowing with N-3,4-dichlorophenyl-N'-methyl-N'-(dimethylcarbamoyl)-hydroxyurea (I) and, for comparison, with N-p-chlorophenyl-N',N'-dimethylurea (II), each at a rate of 5 kg. of active ingredient per hectare dispersed in 500 liters of water. During the emergence of the broadleaved and grass weeds it was observed that after 2 weeks active ingredient I had killed the broadleaved and grass weeds, whereas in the case of active ingredient II it was 4 to 5 weeks before they completely withered.

EXAMPLE 4

A cultivated plot which was overgrown with wild mustard (Sinapis arvensis), white goosefoot (Chenopodium album), small nettle (Urtica urens), chickweed (Stellaria media), gallant soldier (Galinsoga parviflora), annual meadow grass (Poa annua) and slender foxtail (Alopecurus myosuroides) was treated at a growth height of the weeds of 3 to 8 cm. with N-3,4-dichlorophenyl-N'-methyl-N'-(2,4-dichlorophenoxyaceto)-hydroxyurea (I) and, for comparison, with N-p-chlorophenyl-N',N'-dimethylurea (II), each at a rate of 5 kg. of active ingredient per hectare dispersed in 500 liters of water. After a few days it could be observed that compound I had a stronger herbicidal action on the broadleaved and grass weeds than II. After 3 weeks almost all the plants were completely withered.

The following compounds have the same biological action as the active ingredients I in examples 3 and 4:

N-3,4-dichlorophenyl-N'-methyl-N'-(isobutyryl)-hydroxyurea
N-3,4-dichlorophenyl-N'-methyl-N'-(2-chloro-2-methylbutanoyl)-hydroxyurea N-phenyl-N'-2-methylcyclohexyl-N'-(dimethylcarbamoyl)-hydroxyurea N-3-chloro-4-bromophenyl-N'-cyclohexyl-N'-(dimethylcarbamoyl)-hydroxyurea N-4-methoxyphenyl-N'-methyl-N'-(2,2-dichlorobutyryl)-hydroxyurea N-3,4-dichlorophenyl-N'-methyl-N'-(2-methyl-2-bromomethylpropionyl)-hydroxyurea N-4-bromophenyl-N'-methyl-N'-(3,4-dichlorophenylaceto)-hydroxyurea N-3,4-dichlorophenyl-N'-methyl-N'-(2-methyl-4-chlorophenoxyaceto)-hydroxyurea N-3,4-dichlorophenyl-N'-allyl-N'-(dimethylcarbamoyl)-hydroxyurea N-4-fluorophenyl-N'-methyl-N'-(2-methyl-2-methoxypropionyl)-hydroxyurea N-4-chlorophenyl-N'-(isobutyryl)-hydroxyurea.

EXAMPLE 5

In a greenhouse the plants Indian corn (*Zea mays*), barley (*Hordeum vulgare*), wheat (*Triticum vulgare*), rice (*Oryza sativa*), small nettle (*Urtica urens*), chickweed (*Stellaria media*), white goosefoot (*Chenopodium album*), wild mustard (*Sinapis arvensis*), corn marigold (*Chrysanthemum segetum*), amaranth pigweed (*Amarantus retroflexus*), chamomile (*Matricaria chamomilla*), tartarian buckwheat (*Fagapyrum tataricum*) and barnyard grass (*Panicum crus galli*) were treated at a growth height of the crop plants of 8 to 20 cm. and of the broadleaved and grass weeds of 2 to 6 cm. with N-3-chlorophenyl-N'-methyl-N'-carboxymethoxyurea (I) and, for comparison, with N-p-chlorophenyl-N'-methyl-N'-methoxyurea (II), each at a rate of 2 kg. of active ingredient per hectare dispersed with sodium lignin sulfonate in 500 liters of water. After 3 to 4 weeks it could be observed that I had as good a herbicidal action as II and was tolerated better by the crop plants barley, wheat, Indian corn and rice. The results of the experiment can be seen from the following table.

|  | Active ingredient | |
|---|---|---|
|  | I | II |
| Crop plants |  |  |
| Indian corn | 0–10 | 30–40 |
| Barley | 0 | 30–40 |
| Wheat | 0 | 40 |
| Rice | 0–10 | 30–40 |
| Unwanted plants |  |  |
| Small nettle | 100 | 100 |
| Chickweed | 80–90 | 90 |
| White goosefoot | 90–100 | 100 |
| Wild mustard | 90–100 | 100 |
| Corn marigold | 90 | 90 |
| Amaranth pigweed | 90 | 90 |
| Chamomile | 90–100 | 90 |
| Tartarian buckwheat | 90–100 | 100 |
| Barnyard grass | 80 | 80 |

0 = no injury
100 = complete kill

The following compounds have the same biological action as in I in example 5:

N-3-chloro-4-bromophenyl-N'-methyl-N'-carboxymethoxyurea

N-3,4-dichlorophenyl-N'-methyl-N'-(α-carboxy)-ethoxyurea

N-4-iodophenyl-N'-methyl-N'-carboxymethoxyurea

N-4-methylsulfonylphenyl-N'-methyl-N'-carboxymethoxyurea

N-4-butoxyphenyl-N'-methyl-N'-(α-carboxy)-ethoxyurea

N-4-tert-butylphenyl-N'-methyl-N'-carboxymethoxyurea

N-3,4-dichlorophenyl-N'-methyl-N'-(α-carboxy-α-chloro)-ethoxyurea

N-4-chlorophenyl-N'-methyl-N'-(α-carboxy-α-bromo)-propoxyurea

N-3,4-dichlorophenyl-N'-methyl-N'-carbo-(1'-ethynyl)-cyclohexoxymethoxyurea

N-4-chlorophenyl-N'-methyl-N'-carbo-(2'-methyl-4'-chloro)-phenoxy-methoxyurea

N-3,4-dichlorophenyl-N'-methyl-N'-cyanomethoxyurea

N-3,4-dichlorophenyl-N'-β-chloroethyl-N'-carboxymethoxyurea.

We claim:

1. N-3,4-dichlorophenyl-N'-methyl-N'-(dimethylcarbamoyl)-hydroxyurea.

2. N-phenyl-N'-2-methylcyclohexyl-N'-(dimethylcarbamoyl)-hydroxyurea.

3. N-3-chloro-4-bromophenyl-N'-cyclohexyl-N'-(dimethylcarbamoyl)-hydroxyurea.

4. N-3,4-dichlorophenyl-N'-allyl-N'-(dimethylcarbamoyl)-hydroxyurea.

5. N-3,4-dichlorophenyl-N'-methyl-N'-(diisopropylcarbamoyl)-hydroxyurea.

* * * * *

PO-1050
(5/69)

UNITED STATES PATENT OFFICE
CERTIFICATE OF CORRECTION

Patent No. 3,621,055      Dated November 16, 1971

Inventor(s) Adolf Fischer et al

It is certified that error appears in the above-identified patent and that said Letters Patent are hereby corrected as shown below:

First page, left-hand column, fifth line, "Zwchocke" should read -- Zschocke --; right-hand column, in the abstract, "method" should read -- methods --.

Column 1, line 29, "ion" should read -- in --.

Column 2, line 2, "pehnyl" should read -- phenyl --.

Column 6, under "$R^2$", twenty-first formula, that portion of the formula reading "$CO_3$" should read -- $CH_3$ --; twenty-ninth formula, that portion of the formula reading " $\overset{CH_3}{\underset{C}{|}}$ " should read -- $\overset{CH_3}{\underset{C}{|}}$ --.

Column 8, under "$R^2$", thirteenth formula, that portion of the formula reading "$\underset{\overset{|}{CH_3}}{C-C\equiv CH}$" should read -- $CH_3$ --; fourteenth formula, that portion of the formula reading "$\underset{\overset{|}{CH_3}}{C-C\equiv CH}$" should read -- $\underset{\overset{|}{CH_3}}{CH-C\equiv CH}$ --; line 71, "water, to" should read -- water. To --.

Column 9, line 22, "dichlorphenyl" should read -- dichlorophenyl --; line 36, in the table, "10-20" appearing under "II" should be under "III"; line 44, "95-90" should read -- 85-90 --.

Signed and sealed this 13th day of June 1972.

(SEAL)
Attest:

EDWARD M. FLETCHER, JR.
Attesting Officer

ROBERT GOTTSCHALK
Commissioner of Patents